United States Patent [19]
Barecki

[11] 3,899,211
[45] Aug. 12, 1975

[54] CANTILEVERED SEAT FOR MOTORCOACH VEHICLES OR THE LIKE

[75] Inventor: Chester J. Barecki, Grand Rapids, Mich.

[73] Assignee: American Seating Company, Grand Rapids, Mich.

[22] Filed: July 19, 1973

[21] Appl. No.: 380,699

Related U.S. Application Data

[63] Continuation-in-part of Ser. No. 211,423, Dec. 23, 1971, Pat. No. 3,747,979.

[52] U.S. Cl. .................... 297/451; 296/63; 297/445
[51] Int. Cl......... A47c 7/02; A47c 7/00; B60n 1/00
[58] Field of Search .......... 297/232, 450, 451, 445, 297/14; 244/122; 296/63, 64; 5/81; 248/235

[56] References Cited
UNITED STATES PATENTS

| | | | |
|---|---|---|---|
| 2,833,503 | 5/1958 | Harshbarger et al. | 248/235 |
| 3,275,283 | 9/1966 | Rauch | 297/349 |
| 3,619,006 | 11/1971 | Barecki | 297/450 |
| 3,625,565 | 12/1971 | Barecki | 297/451 |
| 3,694,830 | 10/1972 | Koller | 5/81 |
| 3,747,979 | 7/1973 | Barecki | 297/451 |

Primary Examiner—Casmir A. Nunberg
Attorney, Agent, or Firm—Price, Heneveld, Huizenga & Cooper

[57] ABSTRACT

A multi-passenger vehicle seat having a generally horizontal seat frame and a generally vertical back frame is supported by a lower cantilever frame which comprises the horizontal seat frame and an inclined truss support frame. The horizontal seat frame includes two elongated horizontal stretcher members attached at one end to the wall of a vehicle and at least two cross frame members interconnecting the stretcher members at laterally spaced locations. The inclined truss support frame is located beneath the horizontal seat frame; and it includes fore and aft inclined frame members rigidly attached at their upper ends to the stretcher members respectively at locations spaced from the vehicle wall. The inclined support frame members extend downwardly from the seat frame and they converge toward each other. They are connected to the wall at locations above the floor of the vehicle. Additional support is provided by at least one diagonal strut across at least a portion of the back frame.

13 Claims, 4 Drawing Figures

PATENTED AUG 12 1975 3,899,211

SHEET 1

CANTILEVERED SEAT FOR MOTORCOACH VEHICLES OR THE LIKE

CROSS-REFERENCE TO RELATED APPLICATION

This is a continuation-in-part of my copending application Ser. No. 211,423, filed in the U.S. Patent Office on Dec. 23, 1971, and entitled CANTILEVERED SEAT FOR MOTORCOACH VEHICLES OR THE LIKE, now U.S. Pat. No. 3,747,979 the disclosure of which is hereby incorporated by reference.

BACKGROUND OF THE INVENTION

The present invention relates to seating; and more particularly, it relates to structure for cantilevering a multi-passenger seat from the side wall of a motorcoach, traincoach or similar transportation vehicle without a supporting connection to the floor. The term "motorcoach seating" is intended to include all types of transportation seating including city service, trains, suburban, and reclining coach seats, characterized in that each seat is intended to hold two or more persons, one near the wall and one or more nearer the aisle of the vehicle.

It has become desirable from the viewpoint of maintenance, to provide seating of the cantilever type, supported entirely from the wall of the vehicle. This type of seat eliminates the usual obstructions connecting the seat to the floor, such as legs, pedestals, or aisle end bases which are usually found supporting the seat at or near the aisle end.

As mentioned, one of the primary advantages of a cantilever-type seat is the ease of cleaning the vehicle with a gang-type sweeper cleaning the entire width of the vehicle in a single sweep, thereby substantially reducing the time and cost of cleaning. There are, however, other advantages to cantilever seats, including a more pleasant and neater appearance, greater facility of ingress and egress by passengers in the seats, elimination of stumbling hazards that legs or bases may contribute to passengers walking down a narrow aisle or exiting from the seat, and ease of retrieving articles from beneath the seats. The latter advantage stems from the fact that an unobstructed view of the floor area is provided, and the available light shines on the unobstructed area. Further, depending upon the seat structure, there may be more room for storage of luggage, etc. beneath a cantilevered seat as well as an increased area for the legs of the passengers located behind the seat.

There are problems, however, in achieving a cantilever seat which has all of the advantages mentioned above yet which is sturdy over the extended period of rugged use expected of a motorcoach seat and which does not become hazardous in the event of a crash. Perhaps the more important of these two considerations is that of safety. In the event of a crash, the seat structure and its attachment to the vehicle wall must be such that the seat does not become detached from the wall either upon crash impact or upon being impacted by a passenger, for example, from the seat behind. If a seat does become detached from the wall, it adds additional energy and momentum to break loose adjacent seats which, in turn, if broken loose, still further increase the danger to passengers. Adjacent seats which are rigidly mounted so as to remain in place in the event of a crash become, in effect, safety barriers to define a critical zone or compartment in which a passenger is restrained from adding to crash momentum and, at the same time, which protects a passenger against the danger of flying objects.

SUMMARY OF THE INVENTION

The cantilevered seat of the present invention achieves all of the advantages of a cantilever seat while achieving substantial crash integrity. That is, in the event of a crash, seats constructed according to the present invention are flexible enough not to impart a substantial amount of energy to an occupant in the case of a crash or to come detached if struck by a passenger, but they also act to provide a compartment to hold a passenger in a safety zone, protected against flying objects and against gathering impact momentum himself.

Seating constructed according to the present invention, which has a generally horizontal seat frame and a generally vertical back frame, comprises a lower cantilever frame including the horizontal seat frame and an inclined truss support frame. The seat frame has two elongated stretcher members attached at one end to the wall of a vehicle and extending outwardly thereof. preferably, at least two cross frame members interconnect the stretcher members at laterally spaced locations. The truss frame is located beneath the seat frame and it acts as a truss not only to hold the seat frame in its horizontal position, but also to enhance its resistance to twisting relative to the wall in the event that it is struck by a loose object in a crash.

The truss frame includes fore and aft inclined frame members rigidly attached at their upper ends to the stretcher members respectively at locations spaced from the vehicle wall, preferably toward the aisle side of the transverse center of the seat frame. The inclined truss frame members extend downwardly from the seat frame, and they converge toward each other. They are connected to the wall at spaced locations above the floor of the vehicle.

A stress analysis of a cantilever frame constructed according to the present invention indicates that it is a substantial improvement, from a safety standpoint, from certain two-passenger seats which have been suggested in the past. Bending in the horizontal seat frame members is minimized by attaching the upper ends of the diagonal support frame members toward the aisle end of the transverse center of the seat. Further, twisting about a vertical axis (that is, away from the wall) is minimized because of the truss effect produced by the inclined or diagonal support frame members. It has been found that each member of the structure contributes to bearing the load and resisting bending or twisting, thereby yielding a safer and more durable structure and providing one which has a high degree of crash integrity.

For additional load-bearing support, especially in seats designed to accommodate three or more passengers, at least one diagonal strut is provided across at least a portion of the back frame. Preferably, the diagonal strut extends from the upper portion of the back frame adjacent the vehicle wall downwardly to a lower portion of the back frame remote from the wall.

Other features and advantages of the present invention will be apparent to persons skilled in the art from the following detailed description of preferred embodiments accompanied by the attached drawing wherein identical reference numerals will refer to like parts in the various views.

DESCRIPTION OF THE PREFERRED EMBODIMENTS

Figure 1:
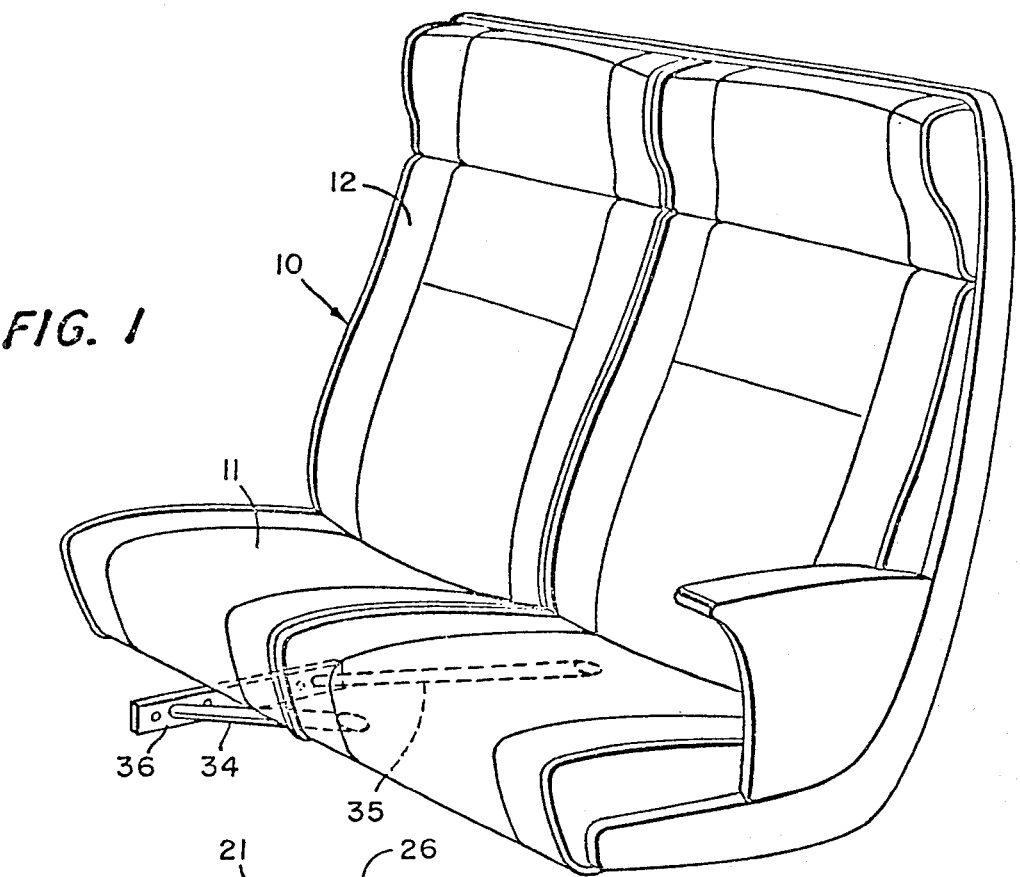
FIG. 1 is a front, perspective view from the aisle side of a two-passenger seat constructed according to the present invention.

Referring to the drawings in more detail, FIG. 1 is a front perspective view taken from the aisle of an upholstered cushioned two-passenger cantilever seat 10 constructed according to the present invention. As shown, seat 10 includes a seat portion 11 and a back portion 12. Although seat 10 is shown as cushioned and upholstered, it will be obvious that the upholstered cushions can be replaced with more durable and economical finishing materials such as plastic or fiberglass seat shells or vinyl-coated sheet metal and the like.

Figure 2:
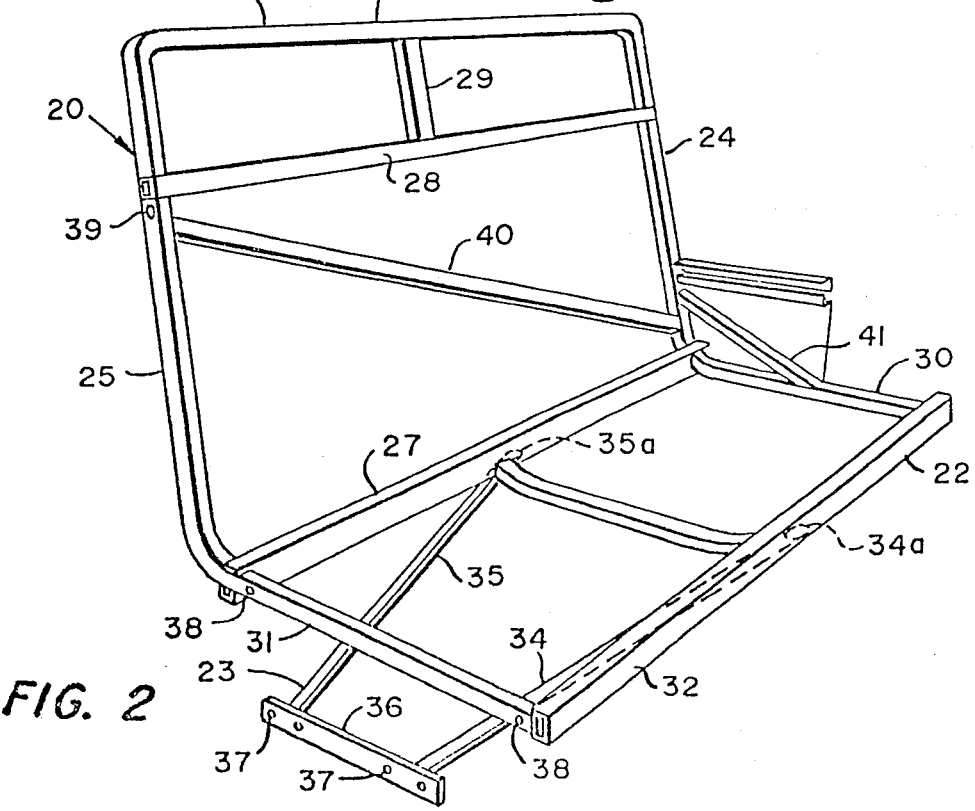
FIG. 2 is a front perspective view of the structural frame of the seat shown in FIG. 1, taken from the wall side.

Referring now to FIG. 2, a front, perspective view taken from the wall side of the structural frame of the seat shown in FIG. 1 is shown, with the upholstered cushions and other frame covering materials having been removed. Structural frame 20 includes a generally vertical back portion 21, a generally horizontal seat portion 22 and a cantilever frame portion 23. For maximum strength and rigidity, the frame components are preferably tubular steel, although other structural members may be utilized.

The back frame portion 21 includes cross frame means aisle side rail 24 and wall side rail 25, and horizontal top stretcher member 26 at the top of back portion 21, bottom horizontal stretcher 27 at the base of back portion 21, and intermediate horizontal stretcher 28 between top stretcher member 26 and bottom stretcher member 27. A central vertical cross member 29 connects stretcher members 26 and 28 at approximately their midpoints to provide more rigid structural integrity to back portion 21.

Seat portion 22 includes cross frame means aisle side rail 30 and wall side rail 31, and horizontal stretcher members 32 at the front and 27 at the rear of seat portion 22. A cross member 33 connects stretcher members 27 and 32 at approximately their midpoints to add structural rigidity to the seat portion 22.

Cantiliever frame 23 includes an inclined truss frame having two inclined frame members 34 and 35 welded or otherwise connected at their upper ends to the two horizontal stretcher members 27 and 32 of seat frame 22 at 34a and 35a, respectively. Preferably, inclined frame members 34 and 35 converge toward each other in the direction of the wall where the lower end of each is connected to a horizontal mounting bar or strap 36. The convergence of inclined members 34 and 35 allows a maximum of leg and foot room for the passengers sitting in seat 10 as well as in the seat behind it. Bar 36 has bolt holes 37 therein for attaching bar 36 to the lower portion of the vehicle wall. Alternatively, bar 36 can be made as two pads at the end of each of the inclined members 34 and 35.

As shown in FIG. 2, the upper end of inclined members 34 and 35 are connected to horizontal stretcher members 32 and 27 at 34a and 35a, respectively, just slightly beyond the midpoint of horizontal stretcher members 32 and 27 toward the aisle. The exact location of these connections may be varied depending on the load requirements of the seat. As the connection is made nearer the wall, less obstruction from the inclined truss frame of cantilever frame 23 results thereby achieving greater leg room and easier access under the seat for cleaning, etc. However, as the connection is located nearer the aisle, greater support strength is achieved. It has generally been found that in two-passenger seats the optimum location for the connection of the upper ends of the inclined members of the inclined truss frame is at the midpoint or slightly on the aisle side of the midpoint of the horizontal seat frame stretcher members.

Mounting holes 38 are also provided in the seat side rail member 31 for mounting seat 10 to the wall of the vehicle by bolts or the like. Although the mounting of seat 10 to the vehicle wall at seat side rail 31 and horizontal bar 36 is adequate in vehicles having walls or wall frames of high structural strength, in vehicles where lighter weight wall or wall frame constructions are utilized, it becomes more desirable to distribute the seat load over a greater wall area. In such cases, a mounting hole 39 can be provided at the upper portion of back side rail 25 for providing a third mounting site. In order to distribute the seat load between the three mounting sites, a diagonal strut 40 is provided across a portion of back frame 21. Such a diagonal strut also serves to strengthen and rigidify back frame 21. It is preferred that diagonal strut 40 extend between an upper portion of side rail 25 and be angled downwardly toward a lower portion of back side rail 24. By this arrangement, the weight of a passenger sitting on the aisle side of seat 10 places diagonal strut 40 under tension which is desirable from a structural strength point of view and which minimizes the possibility of diagonal strut 40 buckling. Also, by locating strut 40 so that a seat load places it in tension, downward deflection of the seat is minimized.

An inclined connecting member 41 is welded or otherwise connected between the lower portion of side rail 24 and the rear portion of side rail 30 which strengthens the aisle end of the seat structure to avoid the seat being forced out of plumb by the constant jarring of the aisle side passenger.

Figure 3:
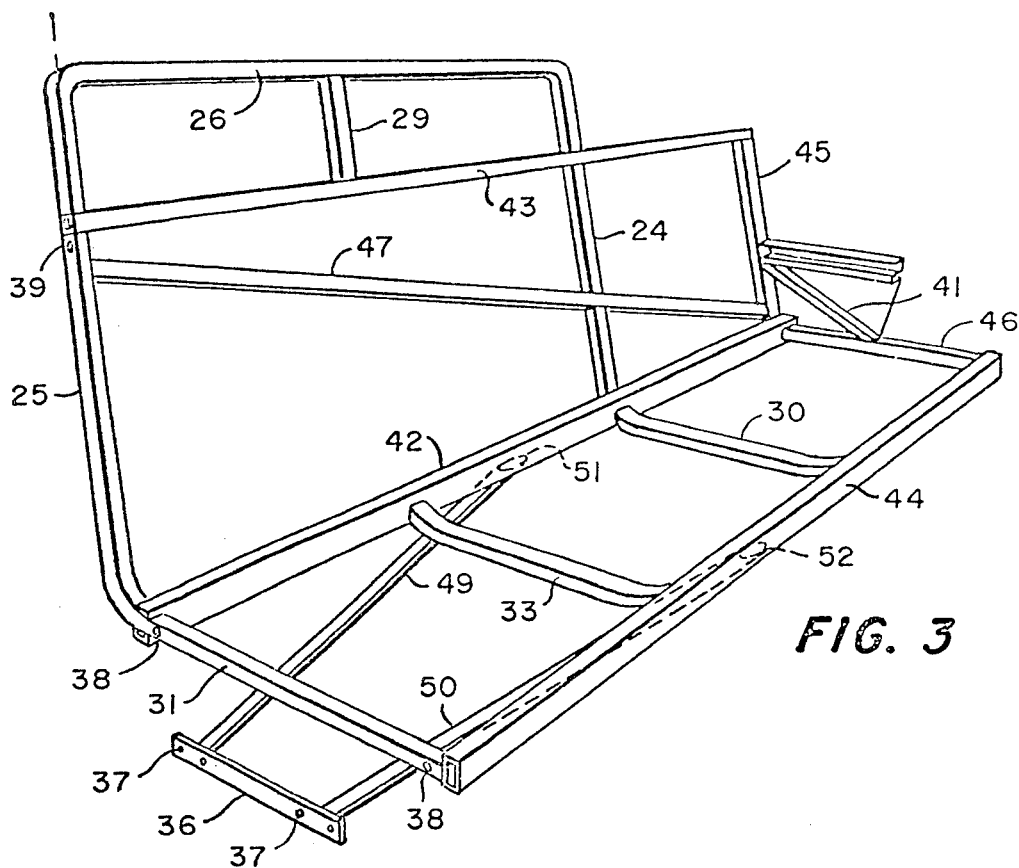
FIG. 3 is a front perspective view from the wall side of the structural frame of a three-passenger seat constructed according to the present invention.
Figure 4:
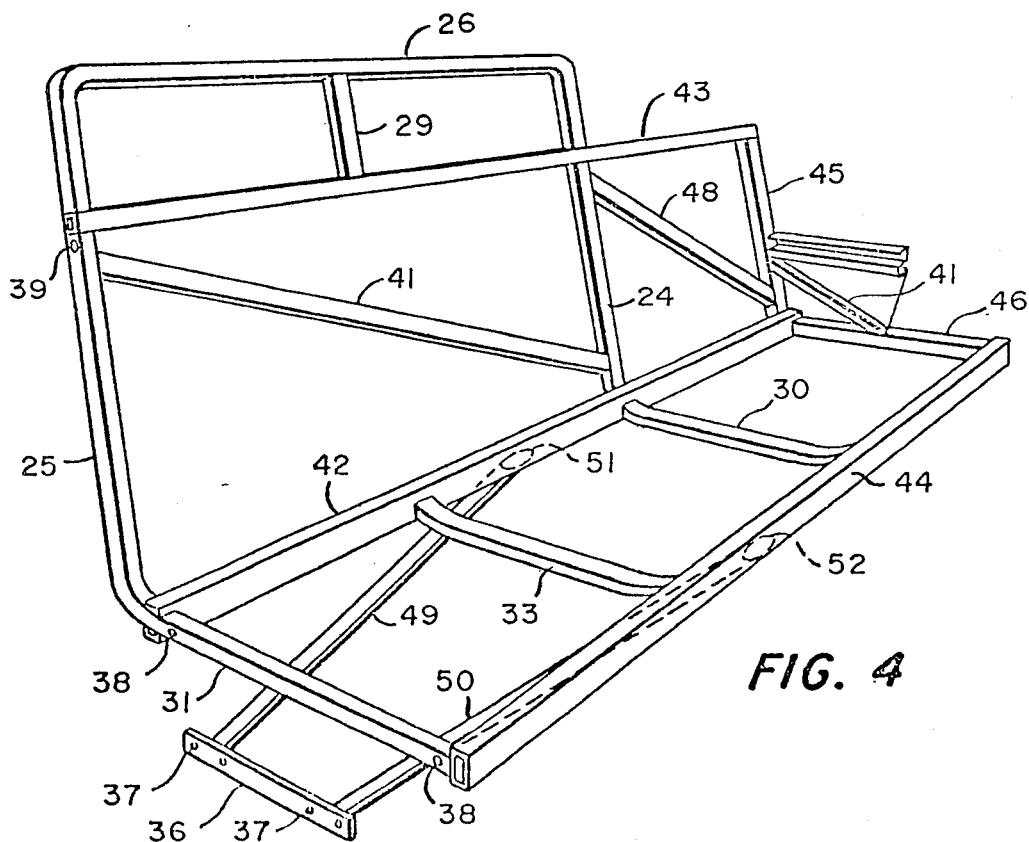
FIG. 4 is a front perspective view from the wall side of the structural frame of another three-passenger seat constructed according to the present invention.

In FIGS. 3 and 4, two alternate embodiments of a three-passenger cantilevered seat frame are shown. The three-passenger seat frame of FIGS. 3 and 4 differ from the two-passenger seat frame shown in FIGS. 1 and 2 by replacing horizontal structure members 27, 28, and 32 with corresponding longer horizontal stretcher members 42, 43, and 44, respectively. Connecting the aisle end of horizontal stretcher members 42 and 43 is a generally vertical aisle side rail member 45, and connecting the ends of horizontal stretcher members 42 and 44 is a generally horizontal aisle side rail member 46. The inclined brace member 41 is relocated between side rail members 45 and 46, as shown. Although top back horizontal stretcher member 26 could be replaced with a longer horizontal stretcher member to provide a back portion on the aisle seat of equal height with the two adjacent seats, the lowered back portion of the third seat is preferred not only to minimize the weight in the aisle end of the seat but also to minimize obstructions to visibility down the aisle of the vehicle.

In FIG. 3, diagonal strut 40 has been replaced with a longer diagonal strut 47 which extends between the upper portion of side rail 25 and the lower portion of aisle side rail 45, with the intersection between diagonal strut 47 and side rail 24 being welded or otherwise rigidified. Diagonal strut 47 not only distributes the entire seat load between the three-wall fastening sites as discussed above, but it also provides additional and needed support for the third or aisle seat which is most remote from the vehicle wall.

In the embodiment shown in FIG. 4, rather than replacing diagonal strut 41 with a longer diagonal strut such as in FIG. 3, diagonal strut 41 remains and an additional diagonal strut 48 has been added in the back portion of the aisle seat extending from the upper portion of side rail 24 downwardly to a lower portion of side rail 45. By this arrangement, a part of the aisle seat load is transmitted by diagonal strut 48 via side rail 24 to diagonal strut 41 through which it is transmitted to wall fastening site 39.

Because of the added load produced by the addition of a third seating area, it is also desirable to employ longer inclined truss frame members 49 and 50, the upper ends of which are connected to horizontal stretcher members 42 and 44, respectively, at locations 51 and 52, more remote from the vehicle wall than the attachment locations 34a and 35a in the two-passenger seat shown in FIGS. 1 and 2.

Although the preferred embodiments of the present invention have been described and illustrated, it will be obvious to those skilled in the art that various changes and modifications can be made in the present invention without departimg from the spirit thereof. Accordingly, the scope of the present invention is deemed to be limited only by the appended claims.

The embodiments of the invention in which an exclusive property or privilege is claimed are defined as follows.

1. In a multi-passenger seat for a vehicle, said seat having at least three sections, the combination comprising a generally vertical back frame and a generally horizontal seat frame said back and seat frames having at least three sections including wall, middle and aisle seating sections, said seat frame having at least two elongated horizontal stretcher members and cross frame means interconnecting said stretcher members at laterally spaced locations to form a rigid structure; an inclined truss frame located beneath said horizontal stretcher members and including forward and rear inclined truss frame members attached at their upper ends to said stretcher members respectively and inclined downwardly from said attachments in generally the same direction as said stretcher members; means for mounting the wall ends of said stretcher members and the lower ends of said inclined truss frame members to the wall of said vehicle at a location above the floor; means for mounting said back frame to the wall of said vehicle; and diagonal strut means across at least a portion of said back frame at said wall and middle sections and across at least a portion of the back frame at said aisle seating section, said seat being characterized in their being no connection between said seat and the floor of the vehicle.

2. The combination of claim 1 wherein said mounting means for mounting the lower ends of said inclined truss frame members comprises an integral elongated bar interconnecting the lower, wall ends of said inclined truss frame members and providing bolt holes adapted to receive bolts for securing said elongated bar to the wall of said vehicles.

3. The combination of claim 1 wherein said cross frame means includes at least first and second side rail members interconnecting said stretcher members respectively at the aisle and wall ends thereof.

4. The combination of claim 1 wherein said inclined truss frame members are connected to associated stretcher members at locations toward the aisle side of the transverse center thereof to enhance resistance of said seat frame to bending and to twisting about a vertical axis.

5. The combination of claim 1 wherein said inclined truss frame members converge downwardly toward each other.

6. The combination of claim 1 wherein said diagonal strut extends from the upper portion of said back frame adjacent said wall downwardly to a lower outer portion of said back frame remote from said wall.

7. The combination of claim 1 wherein said diagonal strut means comprises two separate struts including a first diagonal strut across at least a portion of the back frame at said wall and middle seating sections and a second diagonal strut across at least a portion of the back frame at said aisle seating section.

8. The combination of claim 7 wherein said first diagonal strut extends from the upper portion of said back frame adjacent said wall downwardly to a lower portion of said back frame at the aisle side of said middle seating section.

9. The combination of claim 8 wherein said second diagonal strut extends from the upper portion of said back frame at the aisle side of said middle seating section downwardly to a lower outer portion of said back frame at the aisle side of said aisle seating section.

10. In a three-passenger seat for a transit vehicle having a back structural frame and a seat structural frame, said back and seat frames having wall, middle and aisle seating sections, the combination comprising a cantilever support frame including an inclined truss frame under said seat structural frame for mounting said seat to the wall; means for mounting said back frame to the wall of said vehicle; and a diagonal strut means across at least a portion of said back frame at said wall and middle sections and across at least a portion of the back frame at said aisle seating section, said seat being characterized in there being no connection between said seat and the floor of the vehicle.

11. The combination of claim 10 wherein said diagonal strut means comprises two separate struts including a first diagonal strut across at least a portion of the back frame at said wall and middle seating sections and a second diagonal strut across at least a portion of the back frame at said aisle seating section.

12. The combination of claim 10 wherein said diagonal strut extends from the upper portion of said back frame adjacent said wall downwardly to a lower outer portion of said back frame remote from said wall.

13. The combination of claim 10 wherein said first diagonal strut extends from the upper portion of said back frame adjacent said wall downwardly to a lower portion of said back frame at the aisle side of said middle seating section.

* * * * *